(12) United States Patent
Copeland et al.

(10) Patent No.: US 7,122,216 B2
(45) Date of Patent: Oct. 17, 2006

(54) VEGETABLE OIL EXTRACTION METHODS

(75) Inventors: Dick Copeland, Omaha, NE (US); George L. Hoover, Elkhorn, NE (US); W. Maurice Belcher, Omaha, NE (US)

(73) Assignee: I.P. holdings, L.L.C., Omaha, NE (US)

( * ) Notice: Subject to any disclaimer, the term of this patent is extended or adjusted under 35 U.S.C. 154(b) by 211 days.

(21) Appl. No.: 10/463,182

(22) Filed: Jun. 16, 2003

(65) Prior Publication Data

US 2004/0253354 A1 Dec. 16, 2004

(51) Int. Cl.
*C11B 1/10* (2006.01)
(52) U.S. Cl. .............................. 426/417; 554/8; 554/9
(58) Field of Classification Search ................ 426/417, 426/629, 634; 554/12, 20, 9
See application file for complete search history.

(56) References Cited

U.S. PATENT DOCUMENTS

| | | | | |
|---|---|---|---|---|
| 2,064,158 A | * | 12/1936 | Harrell et al. ............... 426/417 |
| 2,282,783 A | * | 5/1942 | Musher ....................... 426/621 |
| 2,331,619 A | | 10/1943 | Morse et al. ............... 260/112 |
| 2,548,434 A | | 4/1951 | Leaders .................... 260/428.5 |
| 2,573,072 A | * | 10/1951 | Vassel ......................... 530/377 |
| 2,861,062 A | | 11/1958 | Borel et al. ................. 260/123 |
| 2,887,395 A | | 5/1959 | Rowe et al. ................. 106/154 |
| 2,950,198 A | * | 8/1960 | King et al. .................. 426/417 |
| 3,100,709 A | * | 8/1963 | Paulsen ....................... 426/634 |
| 3,271,160 A | | 9/1966 | Kopas et al. ..................... 99/2 |
| 3,361,574 A | * | 1/1968 | Paulsen ....................... 426/634 |
| 3,361,575 A | * | 1/1968 | Paulsen ....................... 426/634 |
| 3,440,055 A | * | 4/1969 | Sartoretto et al. ........... 426/650 |
| 3,515,736 A | | 6/1970 | Goldblatt et al. ......... 264/412.4 |
| 3,852,504 A | * | 12/1974 | Mihara et al. ............... 426/626 |
| 3,870,801 A | | 3/1975 | Tombs ......................... 426/92 |
| 3,941,764 A | * | 3/1976 | Hensarling et al. ......... 530/377 |
| 3,966,702 A | | 6/1976 | Carey ....................... 260/123.5 |
| 3,988,480 A | * | 10/1976 | Ames et al. .................... 426/2 |
| 4,049,686 A | * | 9/1977 | Ringers et al. .............. 554/204 |
| 4,093,540 A | * | 6/1978 | Sen Gupta .................... 554/80 |
| 4,104,290 A | * | 8/1978 | Koslowsky .................. 554/205 |
| 4,158,656 A | | 6/1979 | Jones et al. ............. 260/123.5 |
| 4,169,090 A | | 9/1979 | Murray et al. .............. 260/112 |
| 4,208,323 A | | 6/1980 | Murray et al. .............. 260/112 |
| 4,255,346 A | | 3/1981 | Kock ....................... 260/412.4 |
| 4,298,540 A | | 11/1981 | Youn et al. .............. 260/412.4 |
| 4,359,417 A | | 11/1982 | Karnofsky et al. ....... 260/123.5 |
| 4,515,726 A | | 5/1985 | Sullivan .................. 260/412.4 |
| 4,560,568 A | * | 12/1985 | Curiel ......................... 426/417 |
| 4,808,426 A | | 2/1989 | Strop et al. ................. 426/417 |
| 4,859,371 A | | 8/1989 | Diosady et al. .......... 260/412.4 |

(Continued)

OTHER PUBLICATIONS

Anderson, 1962, Refining of oils and fats for edible purposes, 2nd revised edition, Peergamon Press, New York, p. 28-40.*

(Continued)

*Primary Examiner*—Carolyn Paden
(74) *Attorney, Agent, or Firm*—McDonnell Boehnen Hulbert & Berghoff LLP

(57) ABSTRACT

This invention relates to methods for treating oil bearing vegetable material, especially oilseeds. Methods of the invention provide for the isolation of certain components of oil bearing vegetable material, including isoflavones, vegetable oil, and a phosphatide fraction substantially free of flatulence-promoting undigestable oligosaccharides and substantially lacking objectionable taste. Methods of the invention also provide for the production of various protein-containing fractions substantially free of flatulence-promoting undigestable oligosaccharides and substantially lacking objectionable taste.

45 Claims, 2 Drawing Sheets

U.S. PATENT DOCUMENTS

| | | | | |
|---|---|---|---|---|
| 4,944,954 | A | | 7/1990 | Strop et al. .................. 426/417 |
| 5,035,910 | A | | 7/1991 | Jones et al. ................. 426/478 |
| 5,077,071 | A | | 12/1991 | Strop .......................... 426/417 |
| 5,085,808 | A | | 2/1992 | Snyder et al. ........... 260/412.4 |
| 5,112,637 | A | * | 5/1992 | Hron et al. ................. 426/629 |
| 5,243,059 | A | | 9/1993 | Ibuki et al. ................. 554/191 |
| 5,278,325 | A | | 1/1994 | Strop et al. .................. 554/12 |
| 5,408,924 | A | | 4/1995 | Arendt et al. ................. 99/516 |
| 5,597,602 | A | | 1/1997 | Peter et al. ................. 426/478 |
| 5,679,393 | A | * | 10/1997 | Laur et al. .................. 426/417 |
| 5,821,299 | A | | 10/1998 | Noda .......................... 524/725 |
| 5,844,086 | A | | 12/1998 | Murray ....................... 530/377 |
| 5,880,300 | A | * | 3/1999 | Kodali ........................ 554/190 |
| 6,005,076 | A | | 12/1999 | Murray ....................... 530/377 |
| 6,113,908 | A | * | 9/2000 | Paton et al. ................. 424/750 |
| 6,146,669 | A | | 11/2000 | Jones et al. ................... 426/53 |
| 6,147,193 | A | | 11/2000 | Kerr et al. .................. 530/378 |
| 6,159,715 | A | | 12/2000 | Porter et al. ................ 435/170 |
| 6,172,248 | B1 | * | 1/2001 | Copeland et al. ........... 554/190 |
| 6,229,033 | B1 | * | 5/2001 | Knowlton ................... 554/223 |
| 6,338,865 | B1 | | 1/2002 | van Putte .................... 426/417 |
| 6,458,406 | B1 | * | 10/2002 | Ono et al. ................... 426/634 |
| 2005/0115897 | A1 | * | 6/2005 | Dueppen et al. ............ 210/634 |

OTHER PUBLICATIONS

Hui, Y. H., 1996, Bailey's Industrial Oil and Fat Products, 5th edition, vol. 2, John Wiley & Sons, Inc, New York, p. 109-110, 315-316.*

Erickson, D.R., editor, "Composition of Soybeans and Soybean Products," *Practical Handbook of Soybean Processing and Utilization*, Chapter 2:9-28 (1995).

Erickson, D.R., editor, "Overview of Modern Soybean Processing and Links Between Processes," *Practical Handbook of Soybean Processing and Utilization*, Chapter 5:56-64 (1995).

Erickson, D.R., editor, "Extraction," *Practical Handbook of Soybean Processing and Utilization*, Chapter 6:65-92 (1995).

Erickson, D.R., editor, "Soybean Meal Processing and Utilization," *Practical Handbook of Soybean Processing and Utilization*, Chapter 7:93-116 (1995).

Erickson, D.R., editor, "Soybean Protein Processing and Utilization," *Practical Handbook of Soybean Processing and Utilization*, Chapter 8:117-160 (1995).

Erickson, D.R., editor, "Nutritional Aspects of Soybean Oil and Protein," *Practical Handbook of Soybean Processing and Utilization*, Chapter 23:460-482 (1995).

Erickson, D.R., editor, "Environmental Concerns in Soybean Processing," *Practical Handbook of Soybean Processing and Utilization*, Chapter 25:504-518 (1995).

*Federal Register, Department of Health, Education and Welfare, Food and Drug Administration*, "Common or Usual Names for Vegetable Protein Products and Substitutes for Meat, Seafood, Poultry, Eggs, or Cheeses Which Contain Vegetable Protein Products as Sources of Protein," vol. 43 (136):30472-30491 (1978).

Lusas et al., "Characteristics and Uses of Glandless Cottonseed Food Protein Ingredients," *JAOCS* 64:973-986 (1987).

Lusas et al., "Glandless Cottonseed: A Review of the First 25 Years of Processing and Utilization Research," *JAOCS* 64(6):839-854 (1987).

Lusas et al., "Separation of Fats and Oils by Solvent Extraction: Non-Traditional Methods," *JAOCS* vol. Basic Principles & Modern Practices, pp. 56-77 (1989).

"Soybeans and Other Oilseeds," *Kirk-Othmer Encyclopedia of Chemical Technology, Fourth Edition*, vol. 22:591-619 (1997).

* cited by examiner

VEGETABLE OIL EXTRACTION METHODS

FIELD OF THE INVENTION

This invention relates to methods for treating oil bearing vegetable material, especially oilseeds. Methods of the invention allow isolation of certain components of oil bearing vegetable material, including isoflavones, vegetable oil, and a phosphatide fraction substantially free of flatulence-promoting indigestable oligosaccharides and substantially lacking objectionable taste. Methods of the invention also allow production of various protein-containing fractions substantially free of flatulence-promoting indigestable oligosaccharides and substantially lacking objectionable taste.

BACKGROUND OF THE INVENTION

United States Department of Agriculture data indicates that world oilseed production reached a record 307.8 million metric tons in 2000. Soybeans represented more than half (56%) of all oilseeds grown throughout the world, followed by rapeseed (12%), cottonseed (11%), peanut (10%), sunflower (7%), palm kernel (2%), and copra (2%). Most of this oilseed crop was processed into edible vegetable oils and protein-rich oilseed meals. Oilseed-derived edible oils were the major source of the 87.2 million metric tons of vegetable oils consumed worldwide in 2000. Oilseed-derived protein meals provided more than 90 percent of the 173.9 million metric tons of the protein meal consumed worldwide in the same period.

The United States 2000 oilseed crop chiefly comprised soybeans, cottonseed, sunflowers, and peanuts. Soybeans dominated, representing 85 percent of all oilseeds grown domestically. Cottonseed ranked a distant second at 8.7 percent, with the remaining percentage share split in a 7:6 ratio between sunflowers and peanuts. For soybeans alone, United States growers devoted a crop area of 74.5 million acres (30.2 million hectares), producing 2.77 billion bushels (75.39 metric tons) of soybeans for a total crop value of $12.2 billion. Much of this soybean crop underwent processing, yielding 17.9 million metric tons of refined soybean oil and 38.2 million metric tons of soybean meal.

Refined vegetable oils are primarily utilized in food products such as shortening, margarine, cooking and salad oils, and confectionary fats. Lecithin, obtained as a valuable byproduct of the vegetable oil refining process, is used in a wide variety of applications ranging from pharmaceuticals to protective coatings. After removal of the oilseed oils, the resulting high-protein oilseed meals are widely used as animal feeds. To a lesser extent, oilseed meals and/or protein products derived therefrom are used in certain human foods.

Oilseed chemical composition varies based on type of oilseed, plant variety, cultivation history, and climactic conditions. Oilseeds are composed primarily of seed coat (hull), oil, protein, water, mono- and oligo-saccharides (also termed sugars), and other minor constituents. Soybeans in particular typically comprise about 20–22 percent by weight oil, about 42–46 percent by weight protein, and about 35 percent by weight carbohydrates on a moisture-free basis.

Several minor oilseed components, such as free fatty acids and coloring matter, can impart objectionable properties to oilseed byproducts and hence must be removed during processing. Other minor oilseed components, such as phosphatides (also termed lecithin), sterols, tocopherols, and isoflavones, can be valuable when isolated and recovered.

Soybeans differ from the other major oilseeds in several respects. Soybeans have a relatively low seed coat (also termed hull) content compared to other oilseeds, and hence are lower in crude fiber. Although soybeans are generally lower in oil content, their protein content far surpasses other oilseeds. Soybeans also uniquely contain several beneficial members of the isoflavone chemical family.

Isoflavones are natural flavonoids that exhibit estrogenic activity. Natural isoflavones are sometimes referred to as phytoestrogens (plant-derived estrogens). The generic chemical structure of isoflavones is given by formula 1 below.

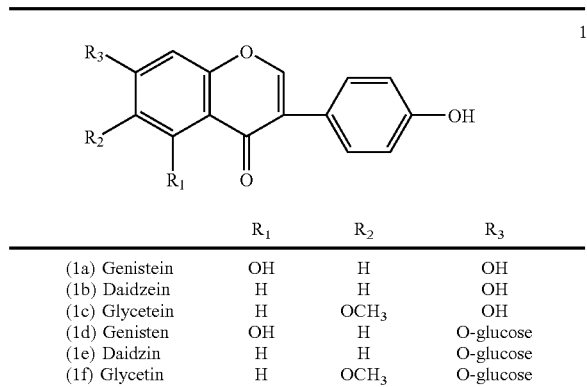

|  | $R_1$ | $R_2$ | $R_3$ |
|---|---|---|---|
| (1a) Genistein | OH | H | OH |
| (1b) Daidzein | H | H | OH |
| (1c) Glycetein | H | $OCH_3$ | OH |
| (1d) Genisten | OH | H | O-glucose |
| (1e) Daidzin | H | H | O-glucose |
| (1f) Glycetin | H | $OCH_3$ | O-glucose |

Soybean isoflavones comprise the aglycone forms genistein (1a) (5,7-Dihydroxy-3-(4-hydroxyphenyl)-4H-1-benzopyran-4-one; 4',5,7-trihydroxyisoflavone) [CAS No. 446-72-0], daidzein (1b) (7-Hydroxy-3-(4-hydroxyphenyl)-4H-1-benzopyran-4-one; 4',7-dihydroxy-isoflavone) [CAS No. 486-66-8], and glycetein (1c) (6-Methoxy-7-hydroxy-3-(4-hydroxyphenyl)-4H-1-benzopyran-4-one), as well as the glycoside forms genisten (1d), [CAS No. 529-59-9], daidzin (1e) and glycetin (1f). Soybean isoflavones exist in the plant mainly in the glycoside forms genisten (1d), daidzin (1e), and glycetin (1f). Total soybean isflavone concentration is about 0.1–0.4 weight percent on a dry basis. The concentration of individual isoflavones present in soybeans is about 0.033–0.2 weight percent genistin, about 0.015–0.08 weight percent daidzin, about 0.005–0.01 weight percent glycetin, and about 0.01–0.04 weight percent of daidzen, genistein, and glycetein. Wang, H., and Murphy, P. A., Isoflavone Composition of American and Japanese Soybeans in Iowa: Effects of Variety, Crop Year, and Location. *Journal of Agricultural and Food Chem.* 1994, 42, 1674–1677.

Epidemiological studies indicate that diets rich in isoflavones lead to a lower incidence of breast and prostate cancer. Isoflavones also appear to reduce heart disease, gallbladder disease, osteoporosis, menopausal difficulties, and lung, colon, stomach, and uterine cancers. The molecular structure of isoflavones is similar to that of the principal human estrogen 17-β-estradiol [CAS No. 50-82-2], compared to which soybean isoflavones demonstrate about 2 percent estrogenic activity.

The main mechanism of action of isoflavones appears to be their ability to bind to the same cellular estrogen receptor (ER) sites as do estrogens. Upon binding, isoflavones display activity as selective estrogen receptor modulators (SERM), meaning that they exert estrogenic action at sites where such action is believed to be favorable, such as the bones and heart, but have no effect or even an antiestrogenic, i.e. inhibitory, effect at sites such as in the uterus and breast where estrogenic action is undesirable. Thus for example, isoflavones can modulate certain cell receptors to reduce bone loss and at the same time preempt estrogen from occupying breast tumor cell receptor sites at which estrogen might stimulate unwanted growth.

In a second mode of action, isoflavones may also indirectly reduce endogenous estrogen production. Gonadotrophins released by the pituitary gland stimulate estrogen synthesis in the ovaries. Isoflavones appear to lower gonadotrophin levels, thereby lengthening menstrual cycles. Women having longer menstrual cycles tend not to develop breast cancer. Lowering gonadotrophin levels also tends to reduce unpleasant menopausal side effects such as hot flashes.

Less favorably, soybeans possess relatively high levels of the indigestible oligosaccharides raffinose and stachyose, which has tended to limit their use in human foods. Sucrose (2), raffinose (3), and stachyose (4) are the principal soluble sugars present in soybeans, and occur in a combined amount of about 15–18 weight percent on a dry basis.

Sucrose (2) is a disaccharide composed of one α-D-glucose unit in pyranose form coupled via a glucoside linkage to one α-D-fructose unit in furanose form. Most animals, including humans, possess the enzyme α-glucosidase, which catalyzes hydrolysis of glucoside linkages and enables breakdown of sucrose into simple sugars that can be digested.

Raffinose (3) is a trisaccharide composed of sucrose coupled via a galactoside linkage to an α-D-galactose unit. Stachyose (4) is a tetrasaccharide composed of raffinose coupled via a galactoside linkage to an additional α-D-galactose unit. Because most animals lack the enzyme α-galactosidase, they cannot break down raffinose and stachyose into simple sugars for digestion. Consequently, raffinose and stachyose pass from the stomach to the lower intestinal tract, where they are fermented by microflora to produce flatus, composed mainly of carbon dioxide, methane, and hydrogen. The resulting flatulence typically produces discomfort, diarrhea, lost appetite, poor growth, and in the case of young animals can even result in death. These effects are responsible in part for the lack of widespread use of soybean-derived nutrients in human foods.

In recovering oil from oilseeds, most processors employ solvent extraction. An optional pre-extraction mechanical pressing step is sometimes used when processing high-oil oilseeds such as sunflower and peanut to remove an initial fraction of oil and thereby reduce the amount of solvent that must be recovered from the extracted oil. Mechanical pressing, also termed expelling, generally involves screw-pressing oilseeds at low pressure to produce an extracted oil fraction and a press cake containing about 5 percent residual oil. Oil obtained from mechanical pressing is similar to that obtained from solvent extraction, but typically contains less phosphatides.

Typical solvent extraction processes involve the four basic steps of preparation, extraction, solvent recovery from the extracted oil (termed miscella), and desolventizing/toasting or flash desolventizing of the de-oiled seed meal. Conventional preparation generally comprises the steps of (1) rough cleaning (often termed scalping) to remove foreign material; (2) drying to loosen hulls; (3) additional cleaning; (4) cracking to break the oilseed into pieces properly sized for dehulling and flaking; (5) optional dehulling (if seeking to produce high-protein meal for animal consumption or flour for human consumption); (6) conditioning to adjust temperature to approximately 70° C. (160° F.) and water content to less than about 11 percent by weight; (7) flaking; and (8) optionally converting flakes into collets via use of "expanders." Flake thickness generally ranges from about 0.2 mm (0.008 in) to about 0.5 mm (0.02 in). In the optional colleting step, expanders (also termed extruders) are used to transform flakes into sponge-like extrudates termed collets. Collets are larger, denser, less fragile, and more porous than flakes. Thus, collets are not as likely as flakes to hinder solvent percolation, and hence extract more rapidly and drain more completely after extraction, thereby reducing the amount of solvent that must be recovered in desolventizing of the extracted solids.

In conventional solvent extraction, solvent partitions oil, phosphatides, and other solvent-miscible components into a liquid miscella phase, leaving a de-oiled seed meal (also termed extracted drained flakes or extracted solids). Physical contact between the solvent and prepared oilseeds typically occurs either by immersing prepared oilseeds in solvent, percolating solvent through a bed of prepared oilseeds, or some combination of both. Solvent in the miscella phase is recovered by vaporization, generally conducted under steam

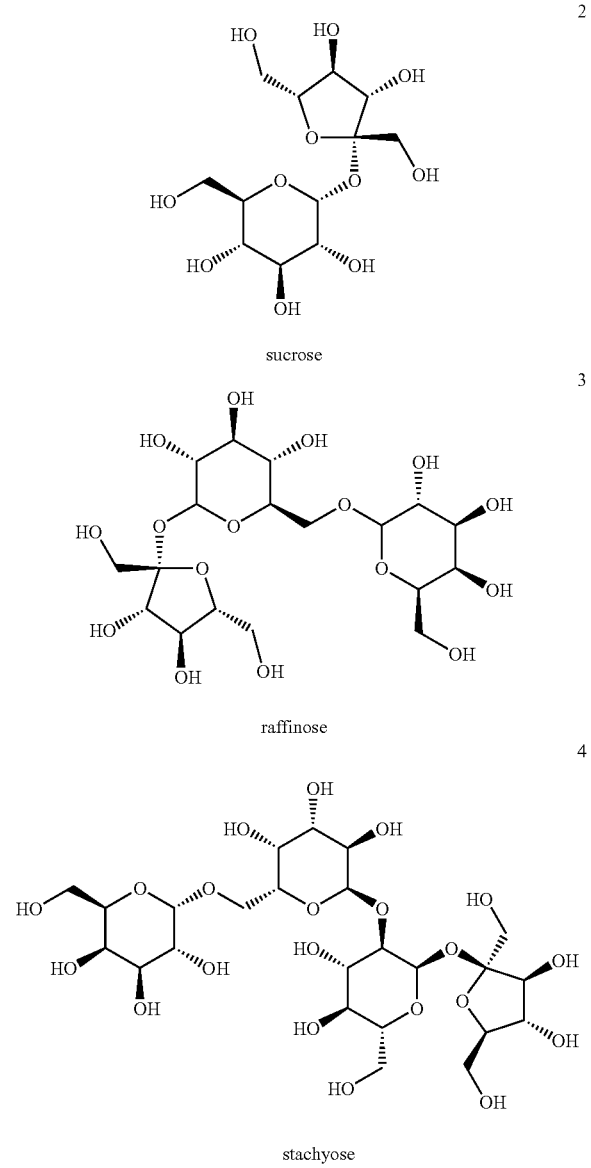

sucrose raffinose stachyose stripping conditions. Residual solvent in the de-oiled seed meal, sometimes referred to as hold-up solvent, is generally recovered either in a desolventizing/toasting system or in a flash desolventizing system, depending on the intended use of the meal. If a lecithinated meal is desired, phosphatides must be added back to the de-oiled seed meal in an extra processing step.

Desolventizing/toasting systems are used to produce a toasted product that is nutritionally well suited for use in animal feeds. The term "toasted" as used by oilseed processors generally means cooked with steam, rather than dry heat. Desolventizing/toasting generally comprises removing solvent and then cooking at 100–105° C. (221–220° F.) at moisture levels ranging from 16 to 24 percent for a time of from about 15 to about 30 minutes. In a typical desolventizer/toaster, steam injected into the de-oiled seed meal furnishes heat required to vaporize the solvent, inactivates antinutritional factors such as trypsin inhibitors and lectin, and elevates moisture levels to facilitate toasting.

Flash desolventizing systems on the other hand are used to produce human foods such as flours, protein concentrates, or protein isolates. Extracted flakes used as precursors in such food production must be desolventized with minimal heat exposure in order to preserve high protein content. In a typical flash desolventizing system, superheated solvent vapor is injected into and conveys the extracted drained flakes to a desolventizing tube, within which the hold-up solvent rapidly vaporizes within about 2 to 5 seconds. The product generated by flash desolventizing is often termed "white flakes."

Desolventized/toasted flakes normally undergo grinding to meet a desired particle size range and are then sold as oilseed meal, chiefly for incorporation into livestock feeds as a principal source of protein. However, typical oilseed meals contain from about 9 to about 15 percent by weight flatulence-promoting indigestable oligosaccharides, including raffinose and stachyose, which limits their use to a certain extent in livestock feed formulations. In an extra processing step, such indigestable oligosaccharides can be extracted with ethanol. Alternatively, the relatively expensive α-galactosidase enzyme is sometimes added to the diet to address the issue of undesirable oligosaccharide content.

Certain oilseed meals must meet standards established by the National Oilseed Products Association (NOPA). For example, NOPA rules provide that non-dehulled soybean meal, often termed low-protein or low-pro meal, must contain at least 44 percent by weight protein and less than 7 percent by weight fiber. Dehulled soybean meal, often termed high-protein or high-pro meal, is required by NOPA to contain at least 48 percent by weight protein and less than about 3.75 percent by weight fiber. Low-protein soybean meal is an excellent protein source for mature livestock and poultry, and is especially ideal for high-energy rations such as broiler, turkey, and pig starter feeds. High-protein meal is preferred in feeding young animals and birds.

Flash-desolventized white flakes are either ground and sold as grits or flour, or are processed further to generate protein concentrates or protein isolates. In a tentative final regulation issued Jul. 14, 1978, (43 Fed. Reg. 30472, 30489) the Food and Drug Administration (FDA) proposed the following definitions for vegetable protein products. A product containing less than 65 percent by weight protein on a moisture-free basis is termed "___ flour," the blank to be filled in with the name of the protein source. A product containing 65 percent or more but less than 90 percent by weight protein on a moisture-free basis is termed "___ protein concentrate," the blank to be filled in with the name of the protein source. A product containing 90 percent by weight or more protein on a moisture-free basis is termed "___ protein isolate," the blank to be filled in with the name of the protein source.

The nutritional qualities of protein meals or flours and their derived products are determined primarily by protein content and amino acid composition. The World Health Organization (WHO) recommends that protein products be required to contain a minimum content of certain essential amino acids, as shown in Table 2.

TABLE 2

| FAO/WHO/UNU-Recommended Essential Amino Acids Requirements (mg/g protein) | | | |
|---|---|---|---|
| Amino Acid | Child, age 2–5 | Child, age 10–12 | Adult |
| Lysine | 58 | 44 | 16 |
| Methionine | 25 | 22 | 17 |
| Cystine | | | |
| Threonine | 34 | 28 | 9 |
| Histidine | 19 | 19 | 16 |
| Leucine | 66 | 44 | 19 |
| Isoleucine | 28 | 28 | 13 |
| Valine | 35 | 25 | 13 |
| Phenylalanine | 63 | 22 | 19 |
| Tyrosine | | | |
| Tryptophan | 11 | 9 | 5 |

Protein meal composition depends not only on oilseed type and but also on processing conditions. For example, overheating tends to destroy key amino acids, such as methione, lysine, and cystine.

Grinding of flakes to form flour or grits typically occurs via hammer mills, pin mills, or classifier mills. Particle size requirements for protein flours generally provide that at least about 97 percent must pass through a U.S. Standard No. 10 Sieve. Grits are generally less fine than flour, and are milled to meet a wide variety of manufacturer- and/or buyer-specified particle size ranges. Soy flour and grits are used in the commercial baking industry as dough conditioning and bleaching aids. Their moisture-retaining qualities also help retard staling.

Protein concentrates are produced by subjecting protein flours to an additional processing step, typically comprising extraction with alcohol, to remove certain components, including objectionable flavor compounds and oligosaccharides. Further additional processing of protein concentrates yields protein isolates, which typically are produced by three main procedures: aqueous-alcohol extraction, acid leaching, and protein denaturing. Processors have long sought simpler methods for producing protein concentrates and protein isolates that employ fewer steps.

Conventional methods for producing soybean protein concentrates generate a sludge, often termed chromasoy molasses, into which isoflavones have been carried throughout processing. Isolating and recovering isoflavones from such sludge is a complicated, lengthy, and expensive process. Thus, soybean processors have long searched for better methods for recovering isoflavones.

Most oilseed solvent extraction operations utilize a solvent blend termed "hexane," which is not pure n-hexane but rather is a mixture of $C_6$ saturated aliphatic and alicyclic hydrocarbons, principally comprising n-hexane, isohexane, and methylcyclopentane, whose boiling points fall within a narrow prescribed range. Extraction-quality hexane is flammable, however, and fluctuates widely in price based on petroleum supply fluctuations. Hexane also is not a GRAS (Generally recognized As Safe) substance, and must be removed from products intended for human consumption. Hexane recovery from miscella and extracted drained flakes is energy-intensive, and the use of hexane is heavily restricted or even banned in certain countries based on environmental concerns. Moreover, hexane-extracted crude oil is a dark-colored, turbid liquid having unacceptable odor and flavor, and which requires substantial further treatment to convert it into a bland, stable, and nutritious product. Such further treatment usually consists of a number of steps collectively referred to as the refining process, which are necessary to remove components such as phosphatides, free fatty acids, sterols, tocopherols, and coloring matter. The refining process typically includes several time-consuming and expensive steps such as degumming, introducing chelating agents to remove trace metal compounds, neutralizing/deacidifying, bleaching, and deodorizing. The capital cost associated with equipment to practice these refining steps is quite high, and traditional refining processes inherently generate oil losses because each refining step produces a residue containing a certain amount of otherwise usable oil, thus decreasing the final yield of oil. Accordingly, oilseed processors have long searched for alternatives to hexane extraction.

Numerous oilseed extraction methods that do not employ hexane have been proposed. Many hexane alternatives have been investigated, including aromatic hydrocarbons such as benzene, toluene, and xylene; halogenated hydrocarbons such as carbon tetrachloride, methylene chloride, trichloroethylene, and dichloroethane; alcohols; ketones such as acetone and methyl ethyl ketone; ethers such as diethyl ether; and esters such as ethyl acetate. For example, Eaves, P. H. et al., JAOCS 29:88 (1952), compared hexane to four alternative solvents (benzene, ethyl ether, acetone, and butanone) in extracting cottonseed flakes. The more polar solvents acetone and butanone yielded crude oils higher in non-oil content compared to hexane-extracted crude oil. After refining and bleaching, none of the non-hexane-extracted oils were as light in color as hexane-extracted oil. The study concluded that none of the alternative solvents compared favorably to hexane.

Halogenated hydrocarbons such as methylene chloride are nonflammable and thus have a distinct advantage over hexane. However, even though extraction studies indicate that methylene chloride compares favorably to hexane, the FDA has delisted many chlorinated solvents because of toxicity concerns.

Alcohols such as ethyl alcohol and isopropyl alcohol have been extensively studied as hexane alternatives in solvent extraction. For example, U.S. Pat. Nos. 4,144,229 and 4,219,470 disclose a four-step process for extracting oilseeds comprising sequentially contacting oilseeds with increasingly concentrated ethanol solutions. Isopropanol extraction is described in U.S. Pat. No. 4,298,540 and in a study by Harris et al., published in three parts at JAOCS 24:370–375 (1947), JAOCS 26:719–723 (1949), and JAOCS 27:273–275 (1950). However, unlike hexane-oil miscellas, mixtures of oil and alcohol are not completely miscible at all ratios. Also, maximum solubility of oil in alcohol can only be achieved by using absolute alcohol grades, which are expensive and difficult to obtain without special distillation methods to overcome azeotrope formation. Moreover, alcohols present flammability concerns. Furthermore, because the latent heat of vaporization of many alcohols is substantially higher than that of hexane, recovery of alcohols via conventional distillation practices is not energy efficient, and requires expensive equipment modifications.

Certain aqueous extraction processes also are known, as noted by Lusas et al., in an article entitled *Separation of Fats and Oils By Solvent Extraction: Non-Traditional Methods*, contained in *World Conference Proceedings, Edible Fats and Oil Processing, Basic Principles and Modern Practices*, American Oil Chemist's Society 1989:56–78. However, as acknowledged by Lusas et al., the primary interest of prior aqueous extraction processes is preserving the nutritional properties of protein in the extracted miscella, and the extracted oil itself has only secondary interest. Moreover, extraction with water alone, even when the water is heated to near boiling, leaves behind significant quantities of oil. Thus, a chief limitation of prior aqueous extraction processes is that the extracted miscella and protein products derived therefrom contain relatively large levels of residual oil.

Solvent mixtures also have been investigated. For example, King et al., JAOCS 38:19 (1961) extracted gossypol from cottonseed flakes using a 44:53:3 acetone:hexane:water mixture. However, crude oils obtained with that solvent mixture contained more impurities than oils extracted with hexane. Moreover, desolventizing an oil-solvent miscella containing mixed solvents and then reclaiming the individual solvents from the recovered solvent mixture both can be quite complex operations.

Thus, previously known methods for treating oil bearing vegetable material all suffer from particular advantages, and processors continue to seek further improvements.

SUMMARY OF THE INVENTION

One aspect of the invention relates to methods for treating oil bearing vegetable material to isolate one or more components, especially vegetable oil and isoflavones.

Another aspect of the invention relates to methods for treating oil bearing vegetable material to produce a phosphatide-containing protein fraction substantially free of stachyose and raffinose and substantially lacking objectionable taste.

A further aspect of the invention relates to methods for treating oil bearing vegetable material to extract oil substantially free of phosphatides and trace metals.

A still further aspect of the invention relates to methods for treating oil bearing vegetable material to produce a protein concentrate These and other aspects of the present invention are achieved in part by extracting an oil bearing vegetable material, consisting in part of vegetable oil, phosphatides, oligosachharides, isoflavones, with an aqueous acid solution having substantial solubility for oligosachharides, isoflavones, and other water-soluble components, and extracting the resulting oil-rich extracted solids with a solvent having substantial solubility for oil.

One embodiment of the invention is a process for treating oil bearing vegetable material that comprises the steps of extracting oil bearing vegetable material with an aqueous acid solution having a temperature of at least about 185° F. for a time sufficient to sequester sugars and isoflavones into an aqueous extract, leaving oil-rich extracted solids; and extracting the oil-rich extracted solids with a first solvent having substantial solubility for oil but not phosphatides for a time sufficient to produce a first solvent-oil phase, leaving a phosphatide-containing protein fraction substantially free of stachyose and raffinose.

Another embodiment of the invention is a process for treating oil bearing vegetable material that comprises the steps of extracting oil bearing vegetable material with an aqueous acid solution having a temperature of at least about 185° F. for a time sufficient to sequester sugars and isoflavones into an aqueous extract, leaving oil-rich extracted solids; extracting the oil-rich extracted solids with a first solvent having substantial solubility for oil but not phosphatides for a time sufficient to produce a first solvent-oil phase, leaving a phosphatide-containing protein fraction substantially free of stachyose and raffinose; and isolating an aqueous isoflavones fraction from the aqueous extract, leaving an aqueous sugar fraction.

Yet another embodiment of the invention is a process for treating oil bearing vegetable material that comprises the steps of extracting oil bearing vegetable material with an aqueous acid solution having a temperature of at least about 185° F. for a time sufficient to sequester sugars and isoflavones into an aqueous extract, leaving oil-rich extracted solids; extracting the oil-rich extracted solids with a first solvent having substantial solubility for oil but not phosphatides for a time sufficient to produce a first solvent-oil phase, leaving a phosphatide-containing protein fraction substantially free of stachyose and raffinose; isolating an aqueous isoflavones fraction from the aqueous extract, leaving an aqueous sugar fraction; and isolating isoflavones from the aqueous isoflavones fraction.

Still another embodiment of the invention is a process for treating oil bearing vegetable material that comprises the steps of extracting oil bearing vegetable material with an aqueous acid solution having a temperature of at least about 185° F. for a time sufficient to sequester sugars and isoflavones into an aqueous extract, leaving oil-rich extracted solids; extracting the oil-rich extracted solids with a first solvent having substantial solubility for oil but not phosphatides for a time sufficient to produce a first solvent-oil phase, leaving a phosphatide-containing protein fraction substantially free of stachyose and raffinose; isolating an aqueous isoflavones fraction from the aqueous extract, leaving an aqueous sugar fraction; and fermenting the aqueous sugar fraction to form acetone.

A further embodiment of the invention is a process for treating oil bearing vegetable material that comprises the steps extracting oil bearing vegetable material with an aqueous acid solution having a temperature of at least about 185° F. for a time sufficient to sequester sugars and isoflavones into an aqueous extract, leaving oil-rich extracted solids; extracting the oil-rich extracted solids with a first solvent having substantial solubility for oil but not phosphatides for a time sufficient to produce a first solvent-oil phase, leaving a phosphatide-containing protein fraction substantially free of stachyose and raffinose; isolating an aqueous isoflavones fraction from the aqueous extract, leaving an aqueous sugar fraction; fermenting the aqueous sugar fraction to form acetone; and recycling the acetone for use in extraction.

A yet further embodiment of the invention is a process for treating oil bearing vegetable material that comprises the steps of extracting oil bearing vegetable material with an aqueous acid solution having a temperature of at least about 185° F. for a time sufficient to sequester sugars and isoflavones into an aqueous extract, leaving oil-rich extracted solids; extracting the oil-rich extracted solids with a first solvent having substantial solubility for oil but not phosphatides for a time sufficient to produce a first solvent-oil phase, leaving a phosphatide-containing protein fraction substantially free of stachyose and raffinose; and distilling the first solvent-oil phase to produce an first solvent-enriched vapor phase, leaving an oil substantially free of metals and having a phosphorus content of less than about 350 ppm.

A still further embodiment of the invention is a process for treating oil bearing vegetable material that comprises the steps of extracting oil bearing vegetable material with an aqueous acid solution having a temperature of at least about 185° F. for a time sufficient to sequester sugars and isoflavones into an aqueous extract, leaving oil-rich extracted solids; extracting the oil-rich extracted solids with a first solvent having substantial solubility for oil but not phosphatides for a time sufficient to produce a first solvent-oil phase, leaving a phosphatide-containing protein fraction substantially free of stachyose and raffinose; distilling the first solvent-oil phase to produce an first solvent-enriched vapor phase, leaving an oil substantially free of metals and having a phosphorus content of less than about 350 ppm; cooling the first solvent-enriched vapor phase to produce a first solvent condensate; rectifying the first solvent condensate to produce a recovered first solvent; and recycling the recovered first solvent for use in extraction.

An even further embodiment of the invention is a process for treating oil bearing vegetable material that comprises the steps of extracting oil bearing vegetable material with an aqueous acid solution having a temperature of at least about 185° F. for a time sufficient to sequester sugars and isoflavones into an aqueous extract, leaving oil-rich extracted solids; extracting the oil-rich extracted solids with a first solvent having substantial solubility for oil but not phosphatides for a time sufficient to produce a first solvent-oil phase, leaving a phosphatide-containing protein fraction substantially free of stachyose and raffinose; and contacting the phosphatide-containing protein fraction with a second solvent having substantial solubility for phosphatides for a time sufficient to sequester phosphatides into a phosphatide-second solvent extract, leaving a protein concentrate.

An additional embodiment of the invention is a process for treating oil bearing vegetable material that comprises the steps of extracting oil bearing vegetable material with an aqueous acid solution having a temperature of at least about 185° F. for a time sufficient to sequester sugars and isoflavones into an aqueous extract, leaving oil-rich extracted solids; extracting the oil-rich extracted solids with a first solvent having substantial solubility for oil but not phosphatides for a time sufficient to produce a first solvent-oil phase, leaving a phosphatide-containing protein fraction substantially free of stachyose and raffinose; contacting the phosphatide-containing protein fraction with a second solvent having substantial solubility for phosphatides for a time sufficient to sequester phosphatides into a phosphatide-second solvent extract, leaving a protein concentrate; and distilling the phosphatide-second solvent extract to produce a second solvent-enriched vapor phase, leaving a phosphatide fraction substantially free of stachyose and raffinose and substantially lacking objectionable taste.

A further additional embodiment of the invention is a process for treating oil bearing vegetable material that comprises the steps of extracting oil bearing vegetable material with an aqueous acid solution having a temperature of at least about 185° F. for a time sufficient to sequester sugars and isoflavones into an aqueous extract, leaving oil-rich extracted solids; extracting the oil-rich extracted solids with a first solvent having substantial solubility for oil but not phosphatides for a time sufficient to produce a first solvent-oil phase, leaving a phosphatide-containing protein fraction substantially free of stachyose and raffinose; contacting the phosphatide-containing protein fraction with a second solvent having substantial solubility for phosphatides for a time sufficient to sequester phosphatides into a phosphatide-second solvent extract, leaving a protein concentrate; distilling the phosphatide-second solvent extract to produce a second solvent-enriched vapor phase, leaving a phosphatide fraction substantially free of stachyose and raffinose and substantially lacking objectionable taste; cooling the second solvent-enriched vapor phase to produce a second solvent condensate; rectifying the second solvent condensate to produce a recovered second solvent; and recycling the recovered second solvent for use in extraction.

An even further embodiment of the invention is a process for treating oil bearing vegetable material that comprises the step of extracting oil bearing vegetable material with a solvent blend having a temperature of at least about 120° F. and comprising from about 5 to about 25 percent by weight of an aqueous acid solution and from about 75 to about 95 percent by weight of a first solvent having substantial solubility for oil but not phosphatides for a time sufficient to produce a solvent blend-oil phase, leaving a phosphatide-containing protein fraction substantially free of stachyose and raffinose.

A even still further embodiment of the invention is a process for treating oil bearing vegetable material that comprises the steps of extracting oil bearing vegetable material with a solvent blend having a temperature of at least about 120° F. and comprising from about 5 to about 25 percent by weight of an aqueous acid solution and from about 75 to about 95 percent by weight of a first solvent having substantial solubility for oil but not phosphatides for a time sufficient to produce a solvent blend-oil phase, leaving a phosphatide-containing protein fraction substantially free of stachyose and raffinose; distilling the solvent blend-oil phase to produce a first solvent-enriched vapor phase, leaving an oil substantially free of metals and having a phosphorus content of less than about 350 ppm; cooling the first solvent-enriched vapor phase to produce a first solvent condensate; and rectifying the first solvent condensate to produce a recovered first solvent.

These and other aspects of the invention will become apparent in light of the detailed description below

DESCRIPTION OF A PREFERRED EMBODIMENT

The present invention relates to improved processes having advantages over those previously disclosed. The methods of the invention produce an extracted crude oil that has a semi-refined quality in that it is low in phosphatides and low in calcium, magnesium and certain other trace metals. The oil is so superior that many subsequent refining steps can be avoided, substantially reducing oil losses suffered by prior known processes. Methods of the invention also allow direct isolation and recovery of isoflavones. Methods of the invention also produce phosphatide-containing protein fractions that are low in indigestible oligosaccharides content and which substantially lack objectionable flavor. Methods of the invention also produce protein concentrates.

As used herein, the term "edible oil" means any one or mixture of oils and/or fats derived from oil bearing vegetable material. The term "vegetable" includes but is not limited to soybean, corn, cottonseed, palm, peanut, rapeseed, safflower, sunflower, sesame, rice bran, coconut, canola, and mixtures thereof.

All methods of the invention can be conducted as batch, semi-continuous, or continuous processes. The invention provides improved methods for treating oil bearing vegetable material. Suitable oil bearing vegetable material includes but is not limited to corn, palm, soybean, cottonseed, peanut, rapeseed, safflower, sunflower, sesame, rice bran, coconut, canola, and mixtures thereof. Oilseeds, including but not limited to soybeans, cottonseed, peanut, and sunflower, are especially suitable. A particularly suitable oil bearing vegetable material is soybeans. Although the present invention is hereafter described more fully with respect to oilseeds, no limitation is implied or intended thereby, and it should be understood that the present invention applies also to other oil bearing vegetable materials, including but not limited to corn, palm, coconut, and canola.

Figure 1:
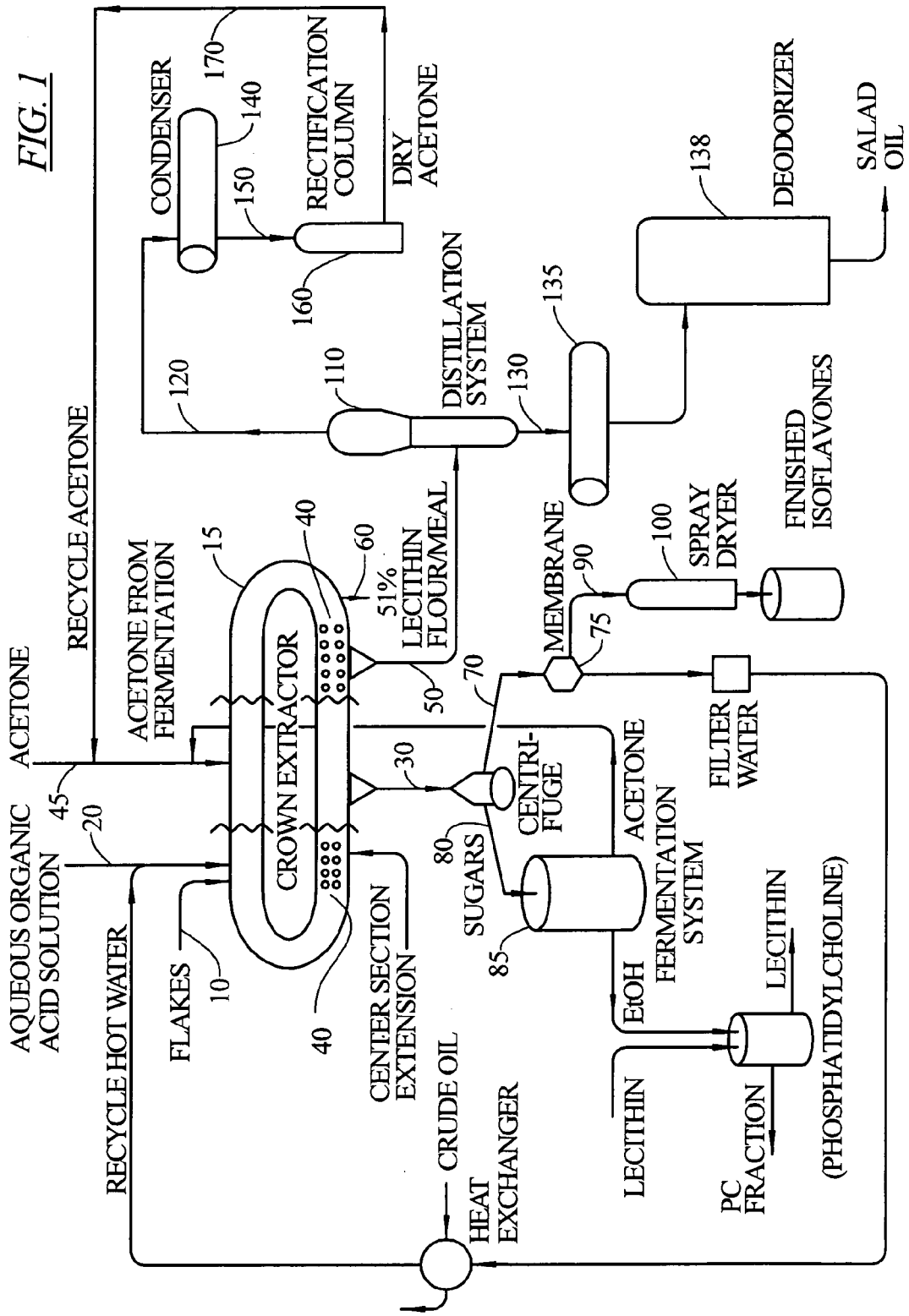
FIG. 1 illustrates one process suitable for carrying out the methods of the present invention.
Figure 2:
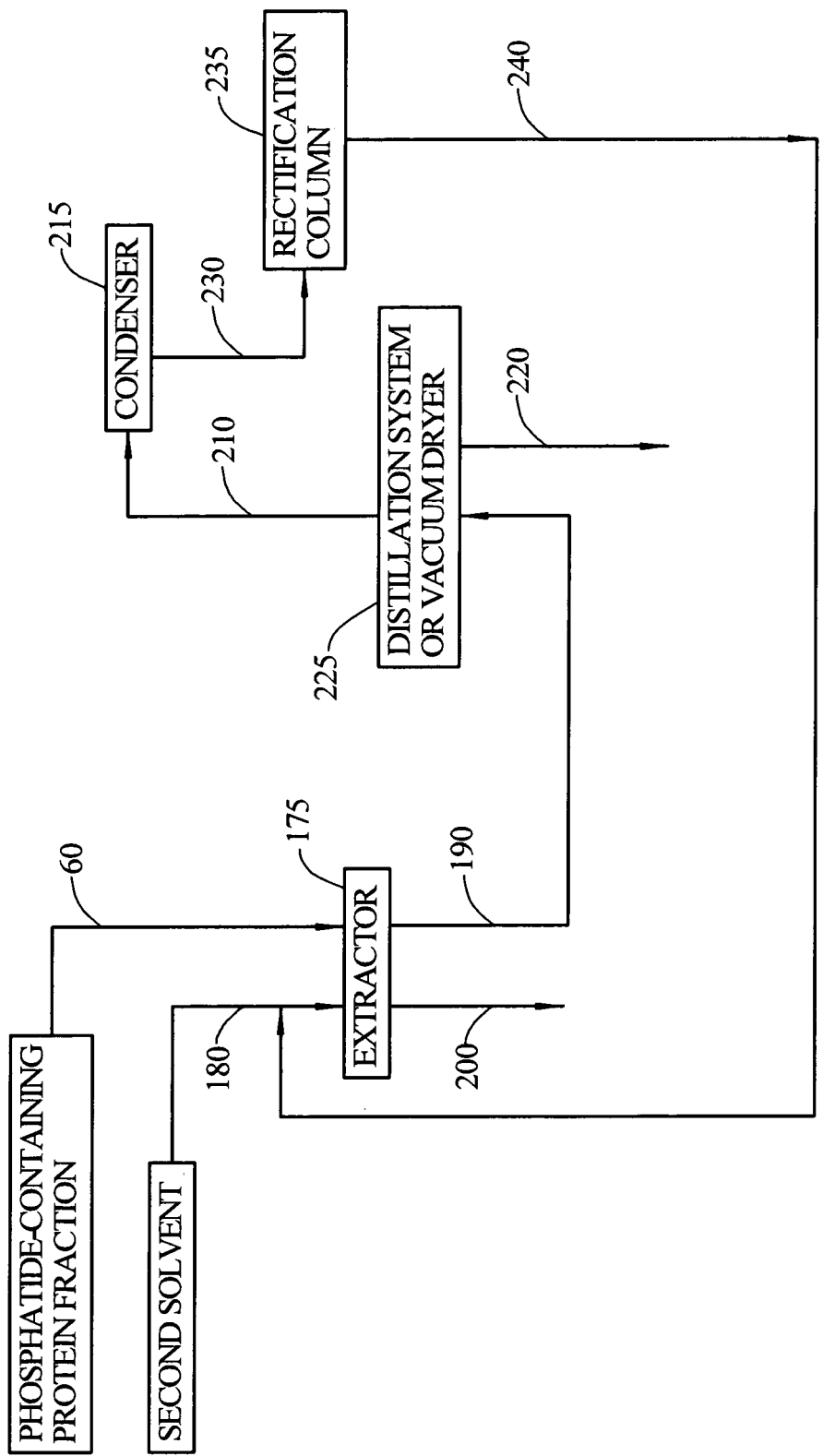
FIG. 2 illustrates another process suitable for carrying out the methods of the present invention.

FIGS. 1 and 2 illustrate certain process suitable for carrying out the methods of the invention. One of ordinary skill understands that the FIGS. 1 and 2 may omit a detailed showing of certain equipment, instrumentation, valving, etc., which would be used in practicing the methods of the invention, as such would be readily apparent to those skilled in extraction and related processing arts.

As illustrated in FIG. 1, one method of the invention for treating oil bearing vegetable material generally entails extracting a suitable oil bearing vegetable material 10, such as soybeans, in extractor 15 with an aqueous acid solution 20 having a temperature of at least about 185° F. for a time sufficient to sequester sugars and isoflavones into an aqueous extract 30, leaving oil-rich extracted solids 40. When the invention is carried out as a batch process, appropriate amounts of oil bearing vegetable material 10 and aqueous acid solution 20 can be brought into contact simultaneously or sequentially in any order. When the invention is carried out as a semi-continuous process, a selected amount of oil bearing vegetable material 10 is contacted with a continuous flow of aqueous acid solution 20. When the invention is carried out as a continuous process, appropriate amounts of oil bearing vegetable material 10 and aqueous acid solution 20 are brought into contact simultaneously.

Optionally, but preferably, the oil bearing vegetable material 10 has been pretreated to render it in optimal condition for extraction by aqueous acid solution 20. Such pretreatment can include any one or more of the following steps: scalping, drying, cracking, pre-pressing, dehulling, conditioning, flaking, colleting, and grinding. Preferably, oil bearing vegetable material 10 is flaked oilseeds. Most preferably, oil bearing vegetable material 10 is flaked soybeans. However, although the present invention is hereafter described more fully with respect to flakes, it should be understood that the invention is equally applicable to any other pretreated or non-pretreated material, including cracked material and press cakes.

Aqueous acid solution 20 may be prepared from any acid that is compatible with oil-bearing vegetable material 10 and which enables extraction of sugars and/or isoflavones. Preferably, however, aqueous acid solution 20 is prepared from a food grade organic acid. Suitable organic acids include but are not limited to acetic acid, citric acid, tartaric acid, succinic acid, formic acid, lactic acid, propionic acid, maleic acid, fumaric acid, gluconic acid, aconitic acid, malonic acid, adipic acid, malic acid, and mixtures thereof. Preferably, the organic acid is citric acid. Mineral acids, such as phosphoric acid, though suitable, are less preferred since trace residual amounts of mineral acids can be difficult to remove and tend to be carried forward in processing and retained in the isolated oil and phosphatide fractions, creating the possibility of degradation of those fractions over time.

Aqueous acid solution 20 can be prepared by dissolving an appropriate amount of a solid acid in water, or it can be prepared by further diluting a previously prepared aqueous acid solution of greater strength. In preparing aqueous acid solution 20, demineralized water is preferably used. Using demineralized water avoids the possibility of converting hydratable phosphatides to non-hydratable phosphatides. As used herein, the term demineralized water means water substantially devoid of calcium and magnesium ions. Aqueous acid solution 20 has a concentration based on the combined weight of acid and water of from about 1 to about 5 percent by weight, preferably from about 2 to about 4 percent by weight, and most preferably from about 2 to about 3.5 percent by weight. Aqueous acid solution 20 has a temperature of at least about 185° F., preferably from about 195° to 210° F., and most preferably from about 200° to about 210° F. Optionally, but preferably, an oxidizing agent such as hydrogen peroxide is added to the aqueous organic solution 20 to promote bleaching of hilum contained in the oil bearing vegetable material 10, the presence of which would otherwise tend to darken the isolated protein fraction. When hydrogen peroxide is incorporated in the aqueous organic solution 20, it is generally used as a 3 percent by weight aqueous solution and in a ratio of from about 3:1 to about 0.3:1 based on the amount of oil bearing vegetable material 10.

Aqueous acid solution 20 is brought in contact by any suitable method in extractor 15 with oil bearing vegetable material 10 for a time sufficient to sequester sugars and isoflavones (if present) into an aqueous extract, leaving oil-rich extracted solids. Contact can be achieved by methods including but not limited to immersion of the oil bearing vegetable material 10 in the aqueous acid solution 20, percolation of the aqueous acid solution 20 through a body of oil bearing vegetable material 10, or by any combination of the two. When contact is achieved via percolation of the aqueous acid solution 20 through a body of oil bearing vegetable material 10, such percolation optionally but preferably occurs in at least two successive stages, with a contact time of from about 10 to about 60 minutes for each stage, although a greater number of stages may be suitable or desirable depending on the source of oil bearing vegetable material 10 and its pre-treatment history. When contact is achieved via immersion of the oil bearing vegetable material 10 in the aqueous acid solution 20, such immersion generally occurs in one stage with a contact time of up to about 45 minutes, although two or more successive stages may be suitable or desirable depending on the source of oil bearing vegetable material 10 and its pre-treatment history. Contact via immersion may be accomplished as a batch process or as a continuous process, where the aqueous acid solution 20 circulates through the immersed oil bearing vegetable material 10. The aqueous acid solution 20 is combined with oil bearing vegetable material 10 in a ratio of from about 10:1 to about 0.5:1, and most preferably from about 1:1, depending on the source of oil bearing vegetable material 10 and its pre-treatment history.

Extraction of oil bearing vegetable material 10 with aqueous acid solution 20 can occur in any suitable extractor 15. A wide variety of equipment exists for contacting oil bearing vegetable materials with an extractant. Among the most common types of extractors used are rotary, stationary basket-type, horizontal belt, and continuous loop. Although mode of action varies widely by type of extractor design and manufacturer, most extractors employ either immersion or percolation techniques. In immersion, particulates are submerged in and/or conveyed through solvent, either in countercurrent stages, each comprising a soaker followed by solids-liquid separation, or in a column or conveyer in which there is a countercurrent flow of particulates and solvent. In percolation, particulates form beds through which solvent percolates. The bed itself acts as filter for the miscella, spent particulates can be drained by gravity prior to desolventizing, the bed affords efficient contact between particulates and solvent, and there is little mechanical wear of equipment.

Continuous loop extractors are preferred. A commercially proven extractor particularly suited for practicing the invention is a Crown Model II, manufactured by Crown Iron Works Co., Minneapolis, Minn., which comprises a shallow-bed extractor in which solids are carried through an enclosed vertical loop inside a stationary casing by a drag conveyer. Feed and discharge configurations vary, and retention time depends on rate of rotation, capacity, and type of oil bearing vegetable material. Extraction sections provide concurrent and countercurrent percolation and immersion. The bed of solids is completely turned over, permitting solvent to contact solids from both sides. Optionally, but preferably, the extractor can be modified to include a center section extension that provides additional residence time.

Extraction with aqueous acid solution 20 produces an aqueous extract 30, containing sugars and isoflavones (if present), leaving oil-rich extracted solids 40. The oil-rich extracted solids 40 can be extracted with a first solvent 45 having substantial solubility for oil but not phosphatides for a time sufficient to produce a first solvent-oil phase 50, leaving a phosphatide-containing protein fraction 60 substantially free of stachyose and raffinose. Preferably, the first solvent 45 is acetone. Generally, the first solvent 45 is combined with the oil-rich extracted solids 40 in a ratio of from about 10:1 to about 0.5:1, and preferably about 1:1, depending on the source of oil bearing vegetable material 10 and its pre-treatment history.

Extraction of oil-rich extracted solids 40 with first solvent 45 can be achieved by any one or combination of the techniques and in any one or more of the equipment types discussed above in connection with extraction of oil bearing vegetable material 10 with aqueous organic acid solution 20. Preferably, extraction of oil-rich extracted solids 40 with first solvent 45 occurs in a continuous loop extractor. When contact is achieved via percolation of the first solvent 45 through a body of oil-rich extracted solids 40, such percolation optionally but preferably occurs in at least two successive stages, with a contact time of from about 10 to about 60 minutes for each stage, although a greater number of stages may be suitable or desirable depending on the source of the oil-rich extracted solids 40. When contact is achieved via immersion of the oil-rich extracted solids 40 in the first solvent 45, such immersion generally occurs in one stage with a contact time of up to about 45 minutes, although two or more successive stages may be suitable or desirable depending on the source of the oil-rich extracted solids 40. Contact via immersion may be accomplished as a batch process or as a continuous process, where the first solvent 45 circulates through the oil-rich extracted solids 40. When extraction of the oil-rich extracted solids 40 occurs by circulating first solvent 45 through immersed oil-rich extracted solids 40, optionally but preferably a portion of the resultant first solvent-oil phase 50 is continuously withdrawn and replaced with an equal portion of fresh first solvent 45. Such a process, termed herein a modified immersion process, generally entails continuously withdrawing from about 10 to about 25 percent by weight, and most preferably about 15 percent by weight, of the resultant first solvent-oil phase 50.

Extraction of the oil-rich extracted solids 40 with first solvent 45 sequesters most of the oil from the oil-rich extracted solids 40 into a first solvent-oil phase 50, leaving a phosphatide-containing protein fraction 60 substantially free of stachyose and raffinose. Typically, the phosphatide-containing protein fraction 60 contains greater than about 50 percent by weight protein, and can be profitably sold as a lecithinated meal suitable for use in animal feeds. Unlike conventional methods for preparing lecithinated meals, which require an extra processing step to add back phosphatides that were removed in the hexane extraction process, the foregoing method of the invention leaves phosphatides in place, and hence leads directly and simply to a lecithinated meal. Because the phosphatide-containing protein fraction 60 is substantially free of flatulence-promoting indigestable oligosachharides such as stachyose and raffinose, it is a vastly more desirable and beneficial feed ingredient for livestock and poultry.

Aqueous extract 30 can be treated to isolate an aqueous isoflavones fraction 70, leaving an aqueous sugar fraction 80. The aqueous isoflavones fraction 70 can be isolated from the aqueous extract 30 in any convenient fashion, including separation by decanting or centrifugation. Preferably, aqueous extract 30 is subjected to centrifugation to produce an aqueous isoflavones fraction 70 and an aqueous sugar fraction 80. Many batch and continuous centrifuge types are suitable, including filter types, such as fixed angle and vertical basket configurations, as well as sedimentation types, including decanter and vertical solid bowl configurations. Because aqueous sugar fraction 80 may be relatively tacky, a basket-type centrifuge is preferred.

Aqueous isoflavones fraction 70 can in turn be treated in a convenient fashion to isolate isoflavones 90. Typically, aqueous isoflavones fraction 70 is subjected to drying or is passed through a semi-permeable membrane 75. Isoflavones 90 can also be isolated from the aqueous isoflavones fraction 70 by passing the aqueous isoflavones fraction 70 through a resin bed, wherein isoflavones are attracted to the resin and are then subsequently recovered by passing hydrogen or other suitable material through the resin bed to preferentially displace isoflavones. A commercially suitable resin is HP20 Diaion, available from Mitsubishi Corp. Preferably, however, aqueous isoflavones fraction 70 is passed through a Pall Filter. Isoflavones 90 can then be recovered and dried to form granules or a powder containing at least about 80 percent by weight isoflavones. Preferably, the isoflavones 90 are dried in a spray dryer 100. Water can be recovered, optionally preheated directly or indirectly, and recycled for use in the preparation of aqueous acid solution 20 and/or extraction of oil bearing vegetable material 10. Unlike conventional extraction methods, which carry isoflavones far forward through processing and deposit them in a sludge from which it is difficult and expensive to recover the isoflavones, the foregoing method of the invention provides for simple and direct recovery of nearly pure isoflavones.

Aqueous sugar fraction 80 can be fermented in a suitable fermentation system 85 to produce a variety of desired fermentation products, including but not limited to ethanol, acetone, and citric acid. If ethanol is the fermentation product, such ethanol can be recovered as a saleable product or can be used in other processes, as, for example, in the preparation of a phosphatidylcholine fraction from phosphatides. If acetone is the fermentation product, such acetone can be recovered as a saleable product or can be used in the extraction of oil-rich extracted solids 40, greatly minimizing the amount of acetone that must be acquired from other parties or processes. If citric acid is the fermentation product, such citric acid can be recovered as a saleable product or can be used in the extraction of oil bearing vegetable material 10, minimizing the amount of citric acid that must be acquired from other parties or processes. Thus, the foregoing method presents a highly economical and environmentally efficient option for extracting oil bearing vegetable material.

The first solvent-oil phase 50 produced by extraction of the oil-rich extracted solids 40 with first solvent 45 can be treated in a distillation system 110 to produce a first solvent-enriched vapor phase 120, leaving an oil 130 substantially free of metals and having a phosphorus content of less than about 350 ppm. Unlike conventional extraction methods, which produce crude oil that must be intensively processed to produce edible oil, the foregoing method of the invention produces oil having a semi-refined quality, and which only needs to be subjected to filtering in filter unit 135 and deodorizing in deodorizer 138 to produce edible oil. Deodorizer 138 can employ any one or combination of suitable techniques, including but not limited to packed column and tray designs. Preferably, filter unit 135 employs granular or pelletized activated carbon. Indeed, if the oil has a low content of chlorophyll and other coloring matter, such oil can proceed directly to deodorization, bypassing even another processing step. Generally, oil 130 contains less than about 5 ppm trace metals.

Preferably, distillation system 110 operates at reduced pressure. Reduced pressure can be generated by any convenient source. Steam jet ejector systems are commonly employed. Also suitable is use of one or more non-steam vacuum sources, such as vacuum pumps, alone or in combination with steam jet ejector systems. Exemplary but non-limiting vacuum pumps include multistage centrifugal pumps, water- or oil-sealed rotary pumps, liquid ring vacuum pumps, or dry-vacuum reciprocating pumps. Most preferably, reduced pressure is generated by a Nash-Kinema three-stage vacuum system or a two-stage vacuum system plus a vacuum pump. With a three-stage ejector system, the usual vacuum generated will be less than about 10 mm Hg.

Optionally, but preferably, the first solvent-oil phase 50 passes through a preheater before being introduced into distillation system 110. Preferably, the first solvent-oil phase 50 is preheated to a temperature near to the operating temperature of distillation system 110. The first solvent-oil phase 50 can be preheated either directly, as by mixing with a separate stream of heated first solvent-oil phase 50, or indirectly, as by a convenient means such as a heat exchanger.

Within distillation system 110, a substantial fraction of the first solvent content of first solvent-oil phase 50 vaporizes, producing a first solvent-enriched vapor phase 120, leaving an oil 130. To minimize the risk of thermal degradation of oil that can occur at high processing temperatures, the first solvent-oil phase 50 remains in distillation system 110 for a time of less than about 60 minutes, and preferably less than about 30 minutes. Optionally, the first solvent-oil phase 50 can be contacted with a stripping gas to accelerate vaporization and/or removal of vaporized fatty acids. Steam is commonly employed as stripping gas. Other suitable stripping gases include but are not limited to non-condensible inert gases.

Distillation system 110 operates at a temperature less than the boiling point of vegetable oils at the operating pressure but greater than the boiling point of the first solvent at the operating pressure.

Optionally, but preferably, the first solvent-enriched vapor phase 120 can be cooled indirectly or directly in any convenient manner, such as by use of a condenser 140, to produce a first solvent condensate 150 that contains at least about 60 percent by weight first solvent. The first solvent condensate 150 in turn can be passed through a rectification apparatus 160 to remove water, thereby producing a recovered first solvent 170 that can be recycled for use in extraction of oil-rich extracted solids 40. Generally, the amount of first recovered solvent 170 is at least about 90 percent of the amount of first solvent 45 originally utilized. Thus, by maximizing recovery of first solvent, the foregoing method of the invention presents a highly efficient, economical and environmentally efficient option for extracting an oil bearing vegetable material.

As illustrated in FIG. 2, if seeking to produce a high-protein concentrate and/or isolate a phosphatide fraction, the phosphatide-containing protein fraction 60 can be extracted with a second solvent 180 having substantial solubility for phosphatides for a time sufficient to sequester phosphatides into a phosphatide-containing second solvent extract 190, leaving a protein concentrate 200. Such extraction can occur in extractor 15 or it can occur in a different extraction vessel 175 to which the phosphatide-containing protein fraction 60 has been transferred. FIG. 2 illustrates extraction as it occurs in the latter case.

Preferably, the second solvent 180 is selected from the group consisting of hexane, isohexane, methylcyclopentane, and mixtures thereof. Generally, the phospatide-containing protein fraction 60 and the second solvent 180 are brought in contact for a time of from about 30 to about 180 minutes. The resulting protein concentrate 200 can be desolventized in any desired fashion to produce a produce having a protein content of at least about 60 percent by weight.

In a manner entirely analogous to the distillation of first solvent-oil phase 50 described above, the phosphatide-containing second solvent extract 190 can be distilled or otherwise dried in the appropriate apparatus 225 to produce a second solvent-enriched vapor phase 210, leaving a phosphatide fraction 220 substantially free of stachyose and raffinose and substantially lacking objectionable taste. In a manner entirely analogous to the treatment of first solvent-enriched vapor phase 120 described above, the second solvent-enriched vapor phase 210 can be condensed in condenser 215 to produce a second solvent condensate 230, which in turn can be rectified in rectifying apparatus 235 to produce a recovered second solvent 240 that can then be recycled for use in the extraction of the phosphatide-containing protein fraction 60.

In an alternative embodiment of the present invention, oil bearing vegetable material 10 can be extracted with a solvent blend having a temperature of at least about 120° F. and comprising a combination of from about 5 to about 25 percent by weight aqueous acid solution 20 and from about 75 to about 95 percent by weight first solvent 45 to form a solvent blend-oil phase. In a manner entirely analogous to the processing steps described above, the solvent blend-oil phase can be distilled to form a first solvent-enriched vapor phase 120, leaving an oil 130 substantially free of metals and having a phosphorus content of less than about 350 ppm. In turn, the first solvent-enriched vapor phase 120 may be cooled to produce a first solvent condensate 150, which in turn may be rectified to produce a recovered first solvent 170.

All documents, e.g., patents, journal articles, and textbooks, cited above or below are hereby incorporated by reference in their entirety.

One skilled in the art will recognize that modifications may be made in the present invention without deviating from the spirit or scope of the invention. The invention is illustrated further by the following examples, which are not to be construed as limiting the invention in spirit or scope to the specific procedures or compositions described therein.

Although the experimental work described in the following examples was conducted using commercial full-fat soybean flakes made with a minimum of heating prior to flaking, no limitation is intended or implied thereby. The processes of the invention can be operated using a variety of feed materials and under a variety of conditions, and are useful in creating a variety of different products.

EXAMPLE 1

A 3 percent by weight aqueous citric acid solution was prepared by combining 81.7 grams of citric acid with 6 pounds of water. The aqueous citric acid solution was heated to 200° F. and circulated through 1.5 pounds of flaked soybeans for 15 minutes. The extraction yielded 1184 grams of an aqueous extract and 142 grams of oil-rich extracted solids. Upon analysis, the aqueous extract was found to contain a total of 177.2 ppm isoflavones, indicating a greater than 96 percent recovery of the 182.9 ppm isoflavones initially present in the flaked soybeans.

EXAMPLE 2

The oil-rich extracted solids of Example 1 were extracted with 2 pounds of acetone heated to 120° F. and circulated for 15 minutes. The resulting phosphatide-containing protein concentrate contained 50.57 weight percent protein, 10.34 weight percent water, and 2148 ppm phosphorus (indicating a content of 6.44 weight percent phosphatides) but was substantially free of raffinose and stachyose. The amino acid content of the phosphatide-containing protein fraction was analyzed and compared to the amino acid content of a protein meal obtained from conventional hexane extraction. The data shown in Table 3 indicate that, compared to conventionally extracted soybean meal, the phosphatide-containing protein fraction contained a greater amount of nearly every amino acid. Moreover, the phosphatide-containing protein fraction met or exceeded nearly every FAO/WHO/UNU-recommended amino acid requirement for adults. Because the phosphatide-containing protein fraction is a lecithinated meal, it contains a greater amount of metabolizable energy compared to conventionally-prepared soybean meals, which are not lecithinated. Furthermore, because the phosphatide-containing protein fraction contains no raffinose or stachyose, it does not promote flatulence, and hence can be incorporated into a wider variety of human and pet foods as compared to conventionally-prepared soybean meals.

TABLE 3

| Amino Acid | Phosphatide-Containing Protein Fraction of Example 2 (11.8% moisture) | Typical Soybean Meal Obtained Via Hexane Extraction (10–12% moisture) |
| --- | --- | --- |
| Arginine | 3.91 | 3.48 |
| Lysine | 3.27 | 3.08 |
| Methionine | 0.72 | 0.7 |
| Cystine | 0.65 | 0.75 |
| Threonine | 2.27 | 1.89 |
| Histidine | 1.42 | 1.25 |
| Leucine | 4.20 | 3.08 |
| Isoleucine | 2.57 | 2.26 |
| Valine | 2.81 | 2.36 |
| Phenylalanine | 2.72 | 2.48 |
| Tyrosine | 1.70 | 1.89 |
| Tryptophan | 0.76 | 0.62 |
| Aspartic Acid | 6.64 | 5.66 |
| Serine | 2.90 | 2.55 |
| Glutamic Acid | 7.87 | 8.95 |
| Proline | 2.88 | 2.57 |
| Glycine | 2.36 | 2.1 |
| Alanine | 2.40 | 2.1 |

EXAMPLE 3

The extraction of Example 2 produced an acetone-oil phase, which upon distillation to vaporize acetone produced soybean oil having the characteristics summarized in column A of Table 4. Compared to conventional hexane-extracted crude soybean oil, which has the characteristics summarized in column B of Table 4, the oil produced by the methods of the invention has a semi-refined quality in that it is extremely low in trace metals and phosphatide content. Filtering the oil through activated carbon produced soybean oil having the characteristics summarized in column C of Table 4. The filtered oil contained essentially no trace metals or phosphatides, and was ready for deodorization without the need for additional refining steps.

TABLE 4

| Component | Soybean Oil of Example 3 | Hexane-Extracted Crude Soybean Oil | Soybean Oil of Example 3, Filtered With Activated Carbon |
| --- | --- | --- | --- |
| Na (ppm) | 2.4 | 0 | 0 |
| Mg (ppm) | 2.4 | 90.0 | 0 |
| Ca (ppm) | 2.6 | 97.0 | 0 |
| Fe (ppm) | 0 | 1.5 | 0 |
| Ni (ppm) | 0 | 0 | 0 |
| Cu (ppm) | 0.06 | 0 | 0.01 |
| P (ppm) | 290.4 | 876.0 | 0 |

EXAMPLE 4

150 grams of flaked soybeans were immersed in 2724 grams of 3 percent by weight aqueous citric acid heated to 200° F. and circulated through the immersed flakes for 15 minutes. The extraction yielded 2268 grams of an aqueous extract. Upon analysis, the aqueous extract was found to contain a total of 0.168 percent isoflavones, indicating a greater than 75 percent recovery of the 0.215 percent isoflavones initially present in the flaked soybeans.

EXAMPLE 5

The oil-rich extracted solids produced by the extraction of example 4 were extracted with 2223 grams of acetone heated to 120° F. and circulated for 15 minutes. The resulting phosphatide-containing protein concentrate contained 64.04 weight percent protein, 11.5 weight percent water, and was substantially free of raffinose and stachyose. The amino acid content of the phosphatide-containing protein fraction was analyzed and compared to the amino acid content of a protein meal obtained from conventional hexane extraction. The data shown in Table 5 indicate that, compared to conventionally extracted soybean meal, the phosphatide-containing protein fraction contained a greater amount of nearly every amino acid. The resultant phosphatide-containing protein fraction contains a greater amount of protein, and hence metabolizable energy, compared to conventionally-prepared soybean meals. Furthermore, because the phosphatide-containing protein fraction contains no raffinose or stachyose, it does not promote flatulence, and can be incorporated into a wider variety of human and pet foods as compared to conventionally-prepared soybean meals.

TABLE 5

| Amino Acid | Phosphatide-Containing Protein Fraction of Example 5 | Typical Soybean Meal Obtained Via Hexane Extraction |
| --- | --- | --- |
| Arginine | 4.6 | 3.48 |
| Lysine | 3.98 | 3.08 |
| Methionine | 0.79 | 0.7 |
| Threonine | 2.62 | 1.89 |
| Histidine | 1.54 | 1.25 |
| Leucine | 5.08 | 3.08 |
| Isoleucine | 2.92 | 2.26 |
| Valine | 3.17 | 2.36 |
| Phenylalanine | 3.18 | 2.48 |
| Tyrosine | 2.14 | 1.89 |
| Tryptophan | 0.88 | 0.62 |
| Aspartic Acid | 7.06 | 5.66 |
| Serine | 3.21 | 2.55 |
| Glutamic Acid | 12.54 | 8.95 |
| Glycine | 2.69 | 2.1 |
| Alanine | 2.86 | 2.1 |

EXAMPLE 6

150 grams of flaked soybeans were immersed in 2800 grams of a solvent blend heated to 120° F. and comprising 15 percent by weight of a 3 percent by weight aqueous citric acid solution and 85 percent by weight of acetone. The solvent blend was circulated through the immersed flakes for 30 minutes. The extraction yielded 2633 grams of an aqueous extract. Upon analysis, the aqueous extract was found to contain a total of 0.077 percent isoflavones, indicating a slightly greater than 35 percent recovery of the 0.215 percent isoflavones initially present in the flaked soybeans. The resulting phosphatide-containing protein concentrate contained 50.07 weight percent protein and 7.81 weight percent water.

The invention and the manner and process of making and using it, are now described in such full, clear, concise and exact terms as to enable any person skilled in the art to which it pertains, to make and use the same. Although the foregoing describes preferred embodiments of the present invention, modifications may be made therein without departing from the spirit or scope of the present invention as set forth in the claims. To particularly point out and distinctly claim the subject matter regarded as invention, the following claims conclude this specification.

What we claim is:

1. A process for treating oil bearing vegetable material, comprising:
   (a) extracting oil bearing vegetable material with an aqueous acid solution having a temperature of at least about 185° F. for a time sufficient to sequester sugars and isoflavones into an aqueous extract, leaving oil-rich extracted solids; and
   (b) extracting the oil-rich extracted solids with a first solvent having substantial solubility for oil but not phosphatides for a time sufficient to produce a first solvent-oil phase, leaving a phosphatide-containing protein fraction substantially free of stachyose and raffinose.

2. The process of claim 1, wherein the oil bearing vegetable material is an oilseed.

3. The process of claim 2, wherein the oilseed is soybeans, rapeseed, cottonseed, peanuts, sunflowers, or mixtures thereof.

4. The process of claim 3, wherein the oilseed is flaked.

5. The process of claim 1, wherein step (a) extracting occurs in at least two stages.

6. The process of claim 1, wherein step (b) extracting occurs in at least two stages.

7. The process of claim 6, wherein step (b) extracting occurs in a continuous loop extractor.

8. The process of claim 7, further comprising step (c) distilling the first solvent-oil phase to produce a first solvent-enriched vapor phase, leaving an oil substantially free of metals and having a phosphorus content of less than about 350 ppm.

9. The process of claim 8, further comprising:
   (d) cooling the first solvent-enriched vapor phase to produce a first solvent condensate;
   (e) rectifying the first solvent condensate to produce a recovered first solvent; and
   (f) recycling the recovered first solvent for use in step (b) extraction.

10. The process of claim 1, wherein step (a) extracting occurs in at least two stages and step (b) extracting occurs in at least two stages.

11. The process of claim 10, wherein step (b) extracting occurs in a continuous loop extractor.

12. The process of claim 11, further comprising step (c) distilling the first solvent-oil phase to produce a first solvent-enriched vapor phase, leaving an oil substantially free of metals and having a phosphorus content of less than about 350 ppm.

13. The process of claim 12, further comprising:
   (d) cooling the first solvent-enriched vapor phase to produce a first solvent condensate;
   (e) rectifying the first solvent condensate to produce a recovered first solvent; and
   (f) recycling the recovered first solvent for use in step (b) extraction.

14. The process of claim 1, wherein step (a) extracting occurs by immersing the oil bearing vegetable material in the aqueous acid solution.

15. The process of claim 1, wherein step (b) extracting occurs by immersing the oil-rich extracted solids in the first solvent.

16. The process of claim 15, wherein the first solvent circulates through the oil-rich extracted solids to produce a circulating first solvent-oil phase.

17. The process of claim 16, further comprising:
   (c) withdrawing and distilling a portion of the circulating first solvent-oil phase to produce a first solvent-enriched vapor phase, leaving an oil substantially free of metals and having a phosphorus content of less than about 350 ppm; and
   (d) replacing the withdrawn portion of circulating first solvent-oil phase with an equal portion of first solvent.

18. The process of claim 17, further comprising:
   (e) cooling the first solvent-enriched vapor phase to produce a first solvent condensate;
   (f) rectifying the first solvent condensate to produce a recovered first solvent; and
   (g) recycling the recovered first solvent for use in step (b) extraction.

19. The process of claim 1, wherein step (a) extracting occurs by immersing the oil bearing vegetable material in the aqueous acid solution and step (b) extracting occurs by immersing the oil-rich extracted solids in the first solvent.

20. The process of claim 1, wherein the aqueous acid solution is prepared using an organic acid.

21. The process of claim 20, wherein the organic acid is selected from the group consisting of acetic acid, citric acid, tartaric acid, succinic acid, formic acid, lactic acid, propionic acid, maleic acid, fumaric acid, gluconic acid, aconitic acid, malonic acid, adipic acid, malic acid, and mixtures thereof.

22. The process of claim 21, wherein the aqueous organic acid solution is an aqueous citric acid solution.

23. The process of claim 1, wherein the aqueous acid solution has a temperature of from about 195° to about 210° F.

24. The process of claim 1, wherein step (a) extracting occurs for a time of at least about 10 minutes.

25. The process of claim 1, wherein the first solvent is acetone.

26. The process of claim 1, wherein step (b) extracting occurs for a time of from about 15 to about 45 minutes.

27. The process of claim 1, wherein phosphatide-containing protein fraction contains greater than about 50 percent by weight protein.

28. The process of claim 1, further comprising step (c) isolating an aqueous isoflavones fraction from the aqueous extract, leaving an aqueous sugar fraction.

29. The process of claim 28, wherein step (c) occurs by centrifugation.

30. The process of claim 28, further comprising step (d) isolating isoflavones from the aqueous isoflavones fraction.

31. The process of claim 30, further comprising step (e) drying the isoflavones.

32. The process of claim 31, wherein step (e) drying occurs by spray drying.

33. The process of claim 28, further comprising step (d) fermenting the aqueous sugar fraction to form acetone.

34. The process of claim 33, further comprising step (e) recycling the acetone for use in step (b) extraction.

35. The process of claim 28, further comprising step (d) fermenting the aqueous sugar fraction to form ethanol.

36. The process of claim 1, further comprising step (c) distilling the first solvent-oil phase to produce a first solvent-enriched vapor phase, leaving an oil substantially free of metals and having a phosphorus content of less than about 350 ppm.

37. The process of claim 36, further comprising:
   (d) cooling the first solvent-enriched vapor phase to produce a first solvent condensate;
   (e) rectifying the first solvent condensate to produce a recovered first solvent; and
   (f) recycling the recovered first solvent for use in step (b) extraction.

38. The process of claim 1, further comprising step (c) contacting the phosphatide-containing protein fraction with a second solvent having substantial solubility for phosphatides for a time sufficient to sequester phosphatides into a phosphatide-second solvent extract, leaving a protein concentrate.

39. The process of claim 38, wherein the protein concentrate has a protein content of at least about 65 percent by weight.

40. The process of claim 38, wherein the second solvent is selected from the group consisting of hexane, isohexane, methylcyclopentane, and mixtures thereof.

41. The process of claim 38, further comprising step (d) distilling the phosphatide-second solvent extract to produce a second solvent-enriched vapor phase, leaving a phosphatide fraction substantially free of stachyose and raffinose and substantially lacking objectionable taste.

42. The process of claim 41, further comprising:
  (e) cooling the second solvent-enriched vapor phase to produce a second solvent condensate;
  (f) rectifying the second solvent condensate to produce a recovered second solvent; and
  (g) recycling the recovered second solvent for use in step (c) extraction.

43. A process for treating oil bearing vegetable material, comprising extracting oil bearing vegetable material with a solvent blend having a temperature of at least about 120° F. and comprising from about 5 to about 25 percent by weight of an aqueous acid solution and from about 75 to about 95 percent by weight of a first solvent having substantial solubility for oil but not phosphatides for a time sufficient to produce a solvent blend-oil phase, distilling the solvent blend-oil phase to produce a first solvent-enriched vapor phase, leaving an oil substantially free of metals and having a phosphorus content of less than about 350 ppm, leaving a phosphatide-containing protein fraction substantially free of stachyose and raffinose.

44. The process of claim 43, further comprising the step of cooling the first solvent-enriched vapor phase to produce a first solvent condensate.

45. The process of claim 44, further comprising the step of rectifying the first solvent condensate to produce a recovered first solvent.

* * * * *